United States Patent [19]
Keilholz

[11] 3,844,544
[45] Oct. 29, 1974

[54] HYDRAULIC SHOCK ABSORBER

[75] Inventor: Friedrich Keilholz, Ennepetal, Germany

[73] Assignee: Firma August Bilstein, Ennepetal, Altenvoerde, Germany

[22] Filed: Mar. 26, 1973

[21] Appl. No.: 344,730

[30] Foreign Application Priority Data
Apr. 1, 1972   Germany............................ 2215921

[52] U.S. Cl................ 267/64 R, 267/116, 188/289, 267/35, 293/70
[51] Int. Cl........................... B60r 19/02, F16f 9/08
[58] Field of Search........ 267/35, 64 R, 64 B, 65 R, 267/65 A, 116, 139, 140, 141; 188/282, 288, 289; 293/1, DIG. 2, 70, 71 R, 71 D, 85, 86, 89, 88

[56] References Cited
UNITED STATES PATENTS
2,089,657   8/1937   Mercier ............................ 188/282
2,559,967   7/1951   Katz ................................. 267/64 R
3,226,146   12/1965   Behr ..................................... 293/60
3,525,449   8/1970   Zanow ............................... 188/289
3,658,314   4/1972   Luzsicza ............................. 267/35
3,695,665   10/1972   Matsuura ........................... 267/116

Primary Examiner—M. Henson Wood, Jr.
Assistant Examiner—Robert Saifer
Attorney, Agent, or Firm—Neuman, Williams, Anderson & Olson

[57] ABSTRACT

A hydraulic shock absorber particularly adapted for use with motor vehicles is provided. The damping fluid of the provided shock absorber is displaced from a flexible container through a fluid passage controllable in its effective cross-section into a storage chamber during the damping process. A separating piston in the storage chamber is acted upon by gas pressure which determines the passage cross section in conjunction with a control needle.

11 Claims, 6 Drawing Figures

(A-B)

(C-D)

HYDRAULIC SHOCK ABSORBER

FIELD OF THE INVENTION

This invention relates to a shock absorber construction and is particularly adapted for use on passenger cars and other similar type vehicles.

THE PRIOR ART

It is a known practice to use hydraulic shock absorbers in association with bumpers for the absorption and dissipation of the energy of impacts which are incurred, for example, by motor vehicles on collision at low speeds. The absorbing of the shocks should proceed in such a way that damage to the vehicle parts is avoided and the shock absorber is capable of returning to its original condition. It is possible, with suitable construction of vehicle bumper surfaces normally involved in collisions to avoid damage and repairs, for example, to headlights or exhaust installations of motor vehicles.

Vehicle energy-consuming bumpers of hollow profiles which are filled with gas or water and which dissipate the collision energy by shape-change work or by giving off water by means of outlets opening on collision are known in the art. These bumpers, however, have progressive characteristic curves, which indicate undesirably high force peaks at the commencement of the collision. Also, shock absorbers for aircraft landing gears, whose stroke can be partially or substantially entirely shortened are known. In the latter constructions the damping fluid is forced through an opening into a chamber which has a slidable piston which on being acted upon by the fluid forced through the opening, compresses a volume of gas. The piston carries a grooved rod which controls, during the entire length of its stroke, the passage cross-section for the damping fluid. The grooves are formed in conformance with the conditions encountered in aircraft landing gears. The latter absorbers generate a characteristic damping curve whereby at first high damping force peaks occur, which are broken down in the choke opening during the stroke of the rod. Such force peaks, however, are undesirable especially in motor vehicles, since they bring about correspondingly abrupt stopping action which can lead to endangering various parts of the motor vehicle or injury to its occupants who are thrown forward.

It is an object of this invention, therefore, to provide a hydraulic shock absorber for motor vehicles, which, although of simple construction, permits a dissipation of the collision energy without force peaks and, is then capable of resuming its initial condition for reuse.

In one embodiment of this invention a container for the damping fluid comprises a flexible tube adapted to absorb the impact force and a movable control needle capable of controlling the cross-section of a damping fluid passage between the hollow body and a storage chamber. Thus the damping fluid is stored in a flexible hollow body, which, in case of a collision, is capable of absorbing the impact force, by delivering the damping fluid through the liquid passage into storage chamber. The fluid delivery takes place with the assistance of a novel control needle in such a way that the colliding object is engaged with a constant damping force regulated by the movement of the control needle. After dissipation of the impact force and, if necessary, after removal of the colliding object causing the impact, the separating piston in the storage chamber acted upon by gas pressure is able to return the damping fluid received in the storage chamber back into the flexible container, so that the shock absorber is again ready for use.

In one embodiment of this invention, the flexible hollow body comprises a flexible unstretchable tube carrying, alone or in common with further flexible hollow bodies, a rigid shock absorbing plate or bumper. The rigid shock-absorbing plate brings about the transfer of the impact force to the tube, which in its size and configuration is designed to correspond to the volume to be received of the damping fluid and to the conformation of the motor vehicle. The flexible hollow body is clamped securely to the storage chamber which provides a simplified shock absorber construction. Included in the means clamping the flexible hollow body in place is a ring flange connected with the motor vehicle, which flange, if need be, has a holder portion adapted to support the flexible hollow body in its deformed state. The clamping part, therefore, serves simultaneously the functions of fastening the flexible hollow body to the storage chamber and connecting the shock absorber assembly to the motor vehicle. Moreover, it can be constructed in such a way that it protectively supports the hollow body when the latter, following a collision, is deformed and while so deformed runs the risk of being damaged by contact with sharp edges or the like.

The flexible hollow body may comprise an unstretchable tube forming the bumper of a motor vehicle. Such a bumper tube protects the motor vehicle from colliding objects and directs the impact force to the passage through which damping fluid is forced into the storage chamber. The fluid passage provides a fluid throttling effect resulting in the dissipation of the impact energy. It is necessary that the tube be unstretchable, since otherwise the tube could be completely compressed at the collision point, without there occurring a lessening of the impact force by displacement of damping fluid into the storage chamber.

The hollow body receiving the impact force may be of a configuration and arranged to repel impacts to the side surfaces of the motor vehicle by curving around side portions of the vehicle. Because of the large available impact area, concentrated and undesirable high impact forces are avoided and as a result the displaced volume passing from the tube remains approximately constant regardless of the form of the colliding object.

For the efficient fastening of the tube to the motor vehicle, the former may be adapted over its entire length to the form of a support plate of the motor vehicle and carried by this support.

In certain embodiments of this invention the flexible hollow body or bodies of this invention containing the damping fluid are connected by means of one or more feed lines adequately dimensioned in cross-section with a storage chamber. The chamber may be separately arranged on the motor vehicles, if the conformation and the structure of the motor vehicle or the like so require.

Preferably, the control needle of the provided shock absorbers is a round bar which presents a flattening of a longitudinal peripheral surface portion, the flattening becoming steadily greater from its point to the base fastened to the separating piston. The control needle can, however, also be formed as a tube, closed on the container side, functioning to connect the storage chamber with the flexible container by means of a plurality of aligned apertures in the tube. In both cases, with increasing displacement of the separating piston by displaced damping fluid, the effective passage cross-section for fluid passage becomes smaller with the needle movement. Since the impact force is broken down by the damping, the damping force remains approximately constant in consequence of the effective passage cross-section becoming smaller.

In a space-saving design the storage chamber may be accommodated in a tubular support of the motor vehicle.

DESCRIPTION OF THE INVENTION

Figure 1:
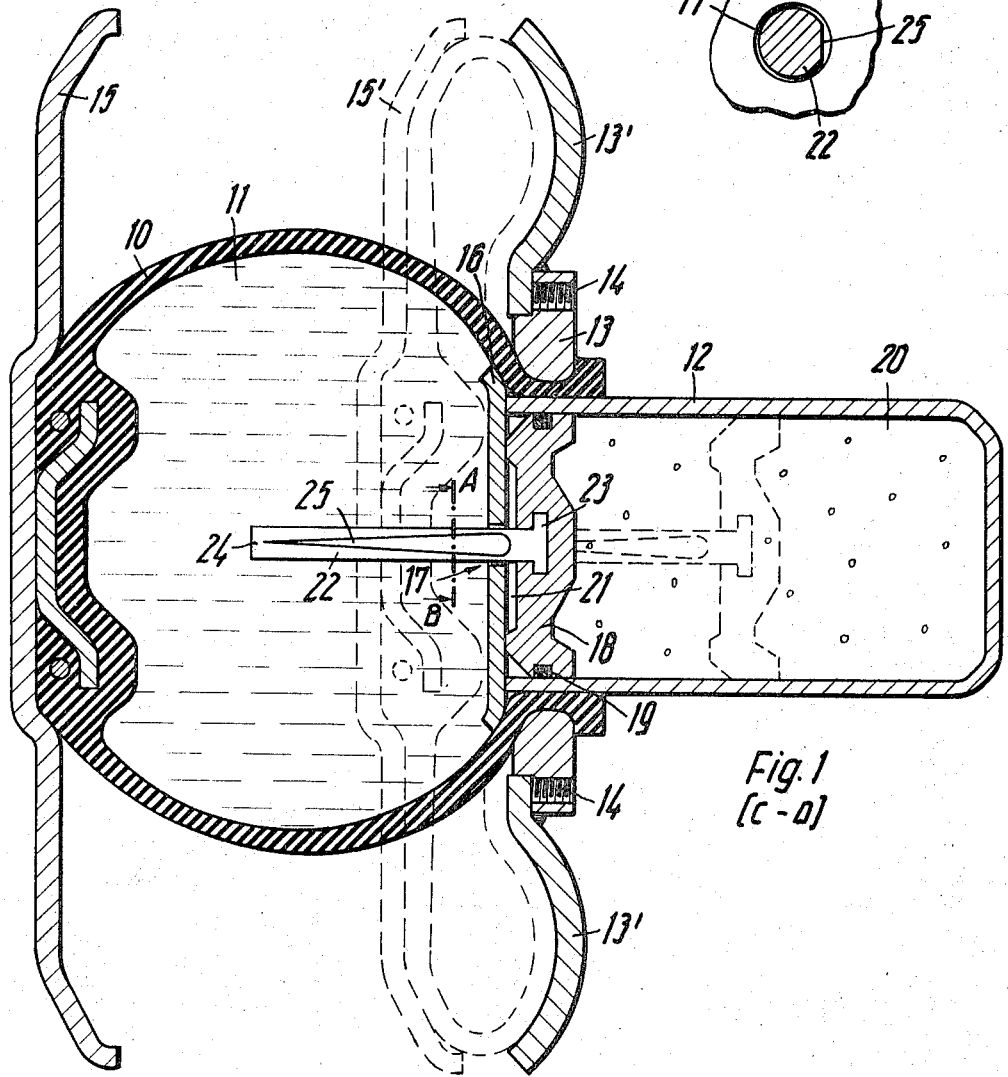
FIG. 1 comprises a sectional view of the hydraulic shock absorber of FIG. 2 taken along line C–D and illustrated on an enlarged scale.

The hydraulic shock absorber represented in FIG. 1 comprises a tube 10 adapted to contain damping fluid 11. This flexible hollow body is securely clamped to storage chamber 12 by means of a ring flange 13 which may in turn be fastened by means of internally threaded bores 14 to supporting elements (not illustrated) of a motor vehicle. The ring flange 13 carries form holders 13', which support the tube 10 when deformed into the position represented in broken lines. Tube 10 carries on one side a rigid bumper plate 15 for the better shielding or transfer of the impact force of a colliding object. Cover plate 16 having centrally arranged liquid passage 17 is disposed over the open end of cylindrically formed storage chamber 12, and serves to seal chamber 12 from the fluid 11 except for the passage 17. In the chamber 12 a separating piston 18 is reciprocally movable and has an outer sealing ring 19 to seal off gas space 20 from storage space 21. The damping fluid such as water or oil is thus prevented from reaching space 20. A liquid passage 17 has mounted therein a control needle 22, the base 23 of which is secured in the separating piston 18 and the point 24 of which extends into the tube 10 filled with damping fluid. Needle 22 comprising a round bar, has a flattening 25 of a longitudinal peripheral surface portion, which becomes steadily greater from the point to the base.

Figure 3:
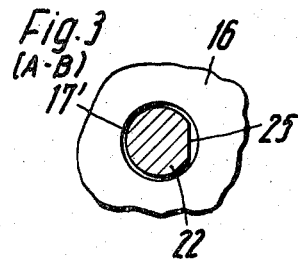
FIG. 3 comprises a sectional view taken on line A–B of FIG. 1.

The section A–B through the needle represented in FIG. 3 makes clear that the liquid passage through the cover plate 16 is dependent upon the portion of needle 22 in passage 17. In the position represented in FIG. 1 of the separating piston disposed adjacent the cover plate 16, there is present the passage cross-section 17' (see FIG. 3). The further the separating piston 18 is slid to the right, the more, therefore, the gas in the gas space 20 is compressed and the less becomes the open area in the passage cross-section 17' between control needle 22 and cover plate 16. In the extreme case the point 24 closes the liquid passage 17 completely.

Figure 6:
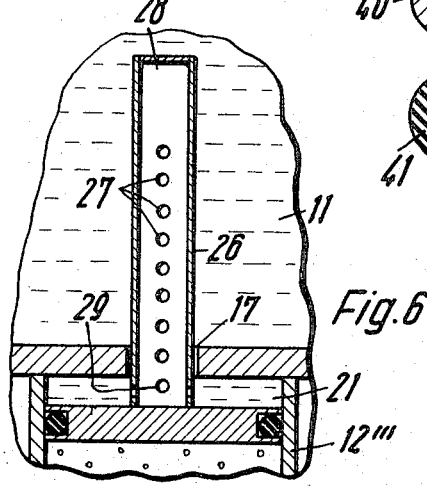
FIG. 6 illustrates a modified control needle for use in shock absorbers of this invention.

Instead of the round bar control needle 22, there can also be used a tube as a control needle, the point of which is closed and the base of which is fastened to the separating piston 18. In this arrangement represented in FIG. 6, the tube 26 fits into the liquid passage 17, so that at the outer peripheral surface of the tube no damping fluid 11 can pass into the storage space 21 of storage chamber 12'''. Fluid 11 flows instead through openings 27 into the tube interior 28 and onward through the openings 29 located in the storage space 21. The openings 27 are successively removed from the damping fluid 11 in the deformable tube in a separating piston displacement, so that the available passage cross-section is progressively reduced. With both control needles, the available passage cross-section becomes smaller as the stroke increases and, if piston displacement becomes great enough, becomes zero.

The shock absorber represented in FIG. 1 operates as follows: in case of a collision against the bumper 15, the previously pressureless damping fluid 11 is suddenly placed under strong pressure, so that it is compelled to flow through the open area of the passage cross-section 17 into the storage space 21. The tube 10 is sufficiently unstretchable so that the liquid is actually displaced into the storage space and tube 10 assumes the dotted line condition. Thus stretching of the tube, cannot occur which might not force liquid 11 into the storage chamber 12. The damping fluid 11 entering the storage space 21 displaces the separating piston 18 to the right and thereby compresses the gas present in the gas space 20. This process takes place until the bumper tube 10 and the separating piston, with its control needle 24, occupy the positions represented with broken lines, and the impact energy is dissipated by choking at the passage cross-section 17'. Since the impact energy becomes less with the displacement of the bumper 13, the displacement of the damping fluid, becomes less and, on the other hand, the open portion of passage cross-section 17 likewise becomes smaller. Thus, the damping effect can be maintained constant as the impact energy is dissipated as rapidly as possible. During the damping process no force peaks occur which could lead to abrupt stops and thereby to the endangering of the vehicle and its occupants.

Figure 2:
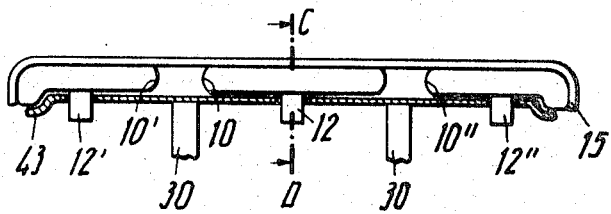
FIG. 2 illustrates an arrangement of several hydraulic shock absorbers on a motor vehicle with a bumper plate mechanically connecting the shock absorbers.

In FIG. 2 several flexible hollow bodies, 10, 10', 10'', are arranged on a mounting element 43 of a motor vehicle. The associated storage containers 12, 12' and 12'', respectively, are built into the mount 43. The containers could also be accommodated in the tubular support elements 30 of the motor vehicle, in order to reduce the production costs. The tubular carriers 30 could even themselves form the storage chambers. The damping fluid containers 10, 10', 10'' carry in common the rigid bumper 15, which in a collision transfers the impact energy to the damping fluid for dissipation in the various storage chambers according to the specific portion of the bumper 15 involved in the collision.

Figure 4:
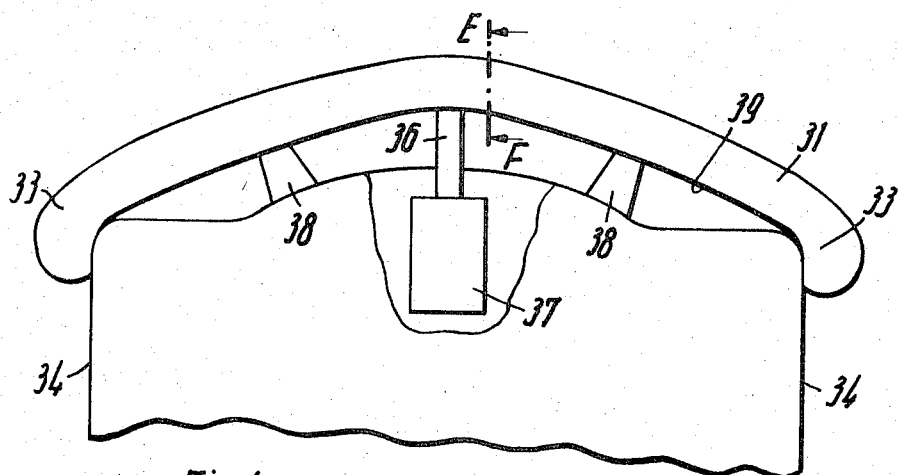
FIG. 4 is a plan view partially broken away and illustrates the arrangement of a single tube disposed along the entire width of the front of a motor vehicle and curved at the ends to function as a bumper.
Figure 5:
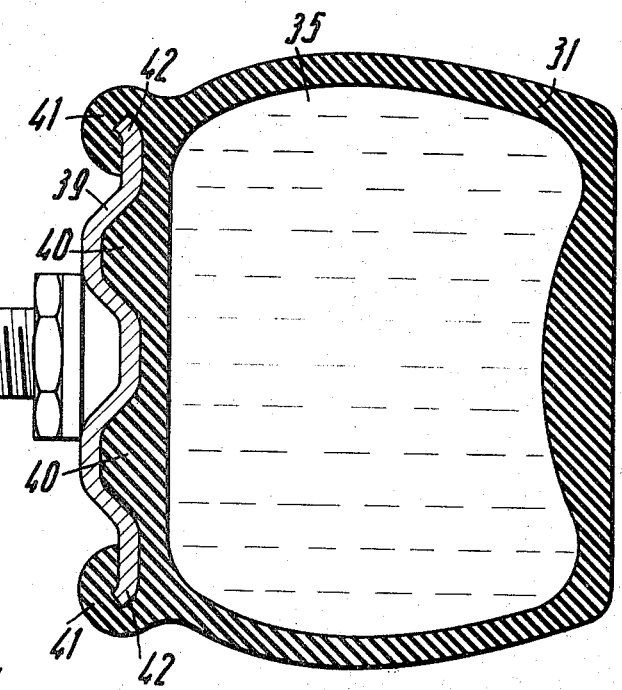
FIG. 5 comprises an enlarged sectional view taken on line E–F of FIG. 4.

In FIG. 5 the tube 31 forms the bumper for the motor vehicle, and it is curved at opposed ends 33 for greater protection to side surfaces 34 of the vehicle. The system of FIGS. 4 and 5 efficiently repels impacts to the side surfaces 34 of the motor vehicle and assures that the bumper surface does not extend merely over the width of the vehicle. The volume of damping fluid 11 displaced in the tube 31 remains approximately constant, therefore, regardless of the form of the struck or colliding object. The interior 35 of the bumper 31 is connected over by means of a line 36 of suitable cross-section with a storage chamber 37 separately mounted on the motor vehicle. The fluid displaced from the tube 31 by the collision flows through the feed line 36 into the chamber 37, in the course of which the fluid passes through a throttling passage corresponding to that illustrated in FIG. 1 and the collision energy is dissipated. Plate 39 carried by the supports 38 serves to support the tube 31. It has for this purpose grooves running longitudinally of the bumper into which there are fitted the corresponding protuberances 40 of the tube. Slotted bead edges 41 of the tube 31 engage longitudinal edges 42 of the plate 31.

What is claimed is:

1. In a hydraulic shock absorber in which damping fluid is displaced from a flexible impact-receiving container through a fluid passage into a storage chamber for said damping fluid having a separating piston for separating damping fluid entering said storage chamber from a compressible gas within said storage chamber, the improvement comprising a flow control means disposed in said fluid passage and movable with said separating piston for progressively reducing the rate of passage of damping fluid into said storage chamber as said piston is moved by said damping fluid into said storage chamber whereby a substantially constant damping effect results in the course of said impact-receiving container receiving an impact.

2. The shock absorber according to claim 1 characterized in that the flexible container is an unstretchable tube, carrying alone or in common with other flexible containers a rigid bumper plate.

3. The shock absorber according to claim 2 characterized in that the flexible container is connected by a feed line suitably dimensioned in cross-section with a storage container separately mounted on the motor vehicle.

4. The shock absorber according to claim 2 characterized in that the flexible container is securely clamped to the storage chamber by clamping means.

5. The shock absorber according to claim 4 characterized in that the clamping means has a ring flange for connection with a motor vehicle and a form holder for supporting the flexible container after deformation.

6. The shock absorber according to claim 1 characterized in that the flexible container is an unstretchable tube forming the bumper of a motor vehicle.

7. The shock absorber according to claim 6 characterized in that the flexible impact-receiving container has curved ends arranged to be impact repelling to the side surfaces of the motor vehicle.

8. The shock absorber according to claim 6 characterized in that the tube is fitted over its entire length to the form of a support plate of the motor vehicle and is carried by this plate.

9. The shock absorber according to claim 1 characterized in that the control means is a tube effecting fluid communication between the flexible container and the storage chamber by means of a plurality of spaced apertures longitudinally arranged along the length of the tube.

10. The shock absorber according to claim 1 characterized in that the storage chamber is accommodated in a tubular support element of a motor vehicle.

11. In a hydraulic shock absorber in which damping fluid is displaced from a flexible impact-receiving container through a fluid passage into a storage chamber for said damping fluid having a separating piston for separating damping fluid entering said storage chamber from a compressible gas within said storage chamber, the improvement comprising a flow control means comprising a round bar having a flattening of its peripheral surface constantly becoming greater from its point to the base fastened to the separating piston disposed in said fluid passage and movable with said separating piston for progressively reducing the rate of passage of damping fluid into said storage chamber as said piston is moved by said damping fluid into said storage chamber whereby a substantially constant damping effect results in the course of said impact receiving container receiving an impact.

* * * * *